(No Model.) 6 Sheets—Sheet 1.

W. F. DURFEE & T. FOWLER.

MECHANISM FOR REDUCING AND TAPERING HORSESHOE NAIL BLANKS.

No. 266,586. Patented Oct. 24, 1882.

WITNESSES.
Isaac Holden
George Terry

INVENTORS.
William F. Durfee
Thaddeus Fowler
Administrator (No Model.) 6 Sheets—Sheet 2.
W. F. DURFEE & T. FOWLER.
MECHANISM FOR REDUCING AND TAPERING HORSESHOE NAIL BLANKS.
No. 266,586. Patented Oct. 24, 1882.
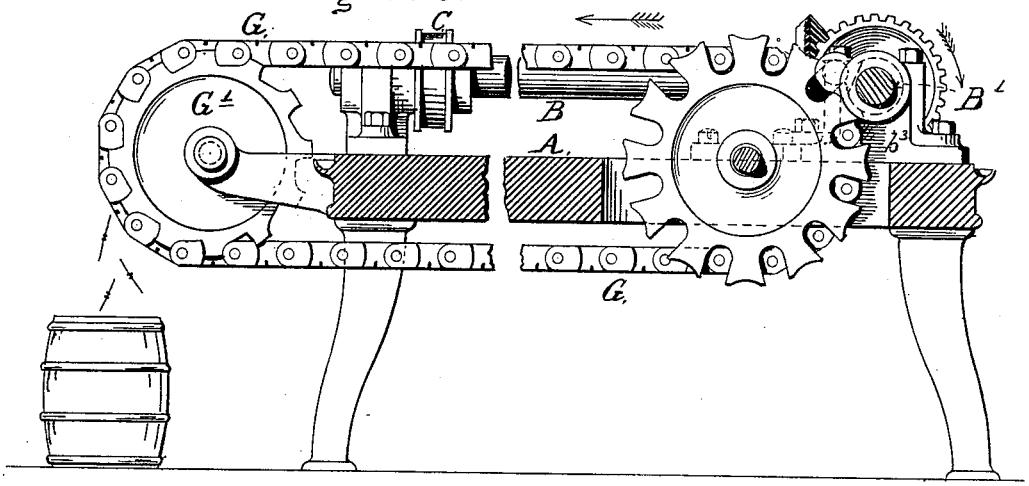
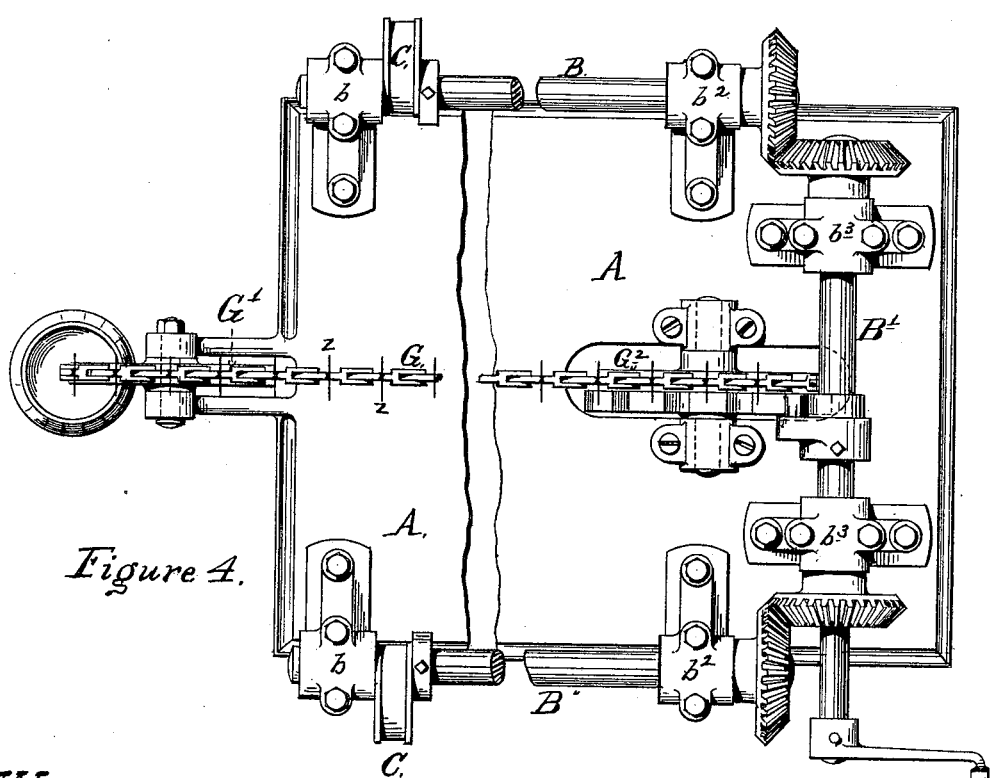

(No Model.) 6 Sheets—Sheet 3.
W. F. DURFEE & T. FOWLER.
MECHANISM FOR REDUCING AND TAPERING HORSESHOE NAIL BLANKS.

No. 266,586. Patented Oct. 24, 1882.

WITNESSES. INVENTORS.

(No Model.) 6 Sheets—Sheet 4.
W. F. DURFEE & T. FOWLER.
MECHANISM FOR REDUCING AND TAPERING HORSESHOE NAIL BLANKS.
No. 266,586. Patented Oct. 24, 1882.

WITNESSES. INVENTORS.

(No Model.) 6 Sheets—Sheet 5.
W. F. DURFEE & T. FOWLER.
MECHANISM FOR REDUCING AND TAPERING HORSESHOE NAIL BLANKS.
No. 266,586. Patented Oct. 24, 1882.
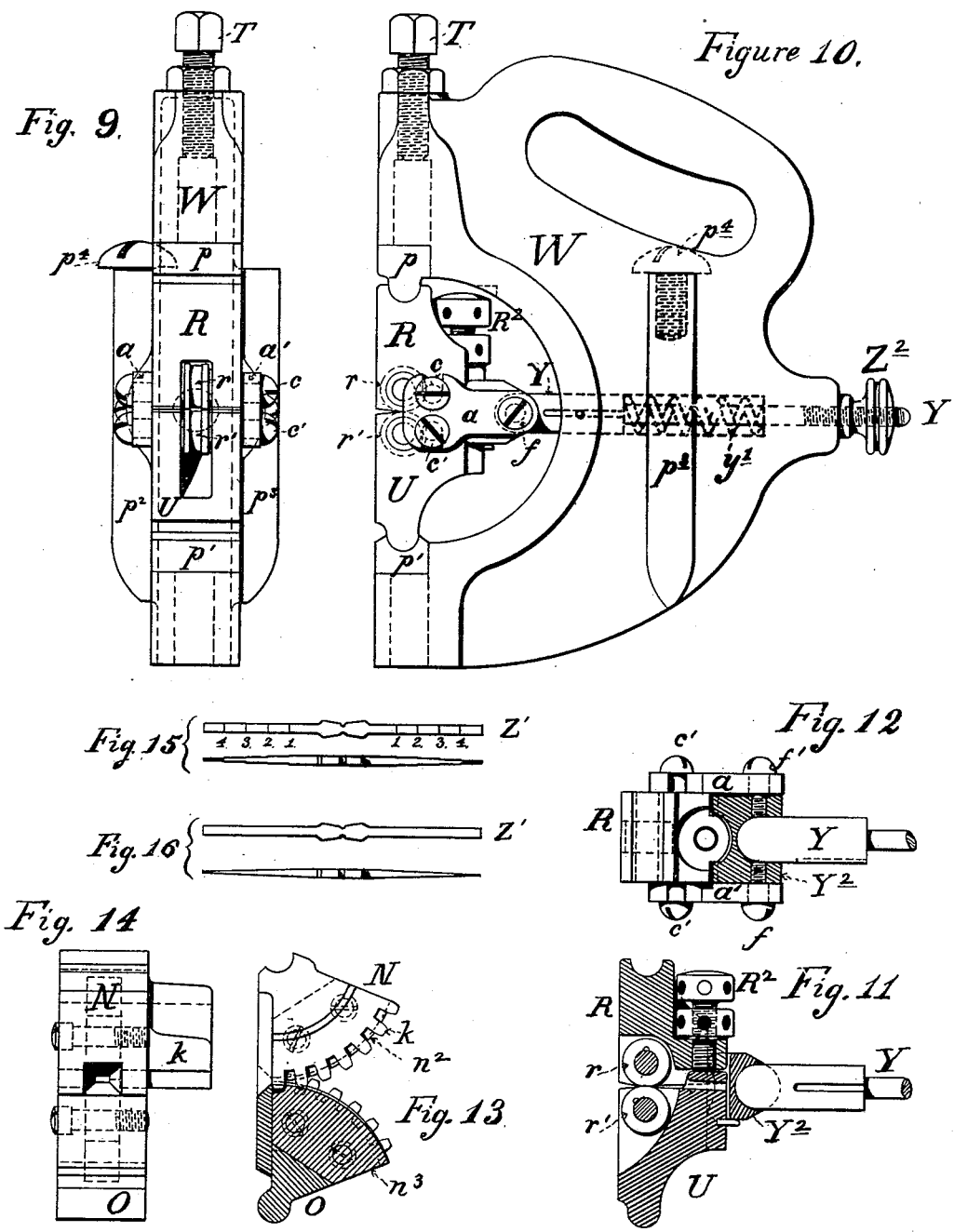
Witnesses
Inventors.

(No Model.) 6 Sheets—Sheet 6.
W. F. DURFEE & T. FOWLER.
MECHANISM FOR REDUCING AND TAPERING HORSESHOE NAIL BLANKS.
No. 266,586. Patented Oct. 24, 1882.

WITNESSES.
INVENTORS.

UNITED STATES PATENT OFFICE.

WILLIAM F. DURFEE, OF BRIDGEPORT, AND THADDEUS FOWLER, OF SEYMOUR, ASSIGNORS TO THE WHEELER & WILSON MANUFACTURING COMPANY, OF BRIDGEPORT, CONNECTICUT; SAID THADDEUS FOWLER ADMINISTRATOR OF HEBER P. FOWLER, DECEASED.

MECHANISM FOR REDUCING AND TAPERING HORSESHOE-NAIL BLANKS.

SPECIFICATION forming part of Letters Patent No. 266,586, dated October 24, 1882.

Application filed March 30, 1882. (No model.)

*To all whom it may concern:*

Be it known that WILLIAM F. DURFEE, a citizen of the United States, residing at Bridgeport, in the county of Fairfield and State of Connecticut, and HEBER P. FOWLER, (deceased,) late a citizen of the United States, residing at Bridgeport, in the county of Fairfield and State of Connecticut, did invent certain new and useful Improvements in Mechanism for Reducing and Tapering Horseshoe-Nail Blanks, of which the following is a specification, reference being made to the accompanying drawings for a more full and better understanding of the same.

For the purpose of illustrating and describing the invention, we have shown it in its application to machinery for drawing down or tapering the extremities of double-ended blanks from which horseshoe nails are to be manufactured.

Figure 1:
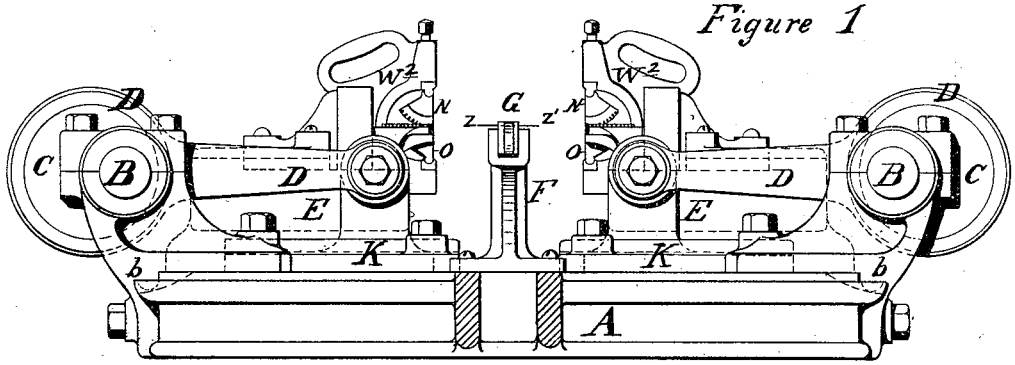
Figure 2:
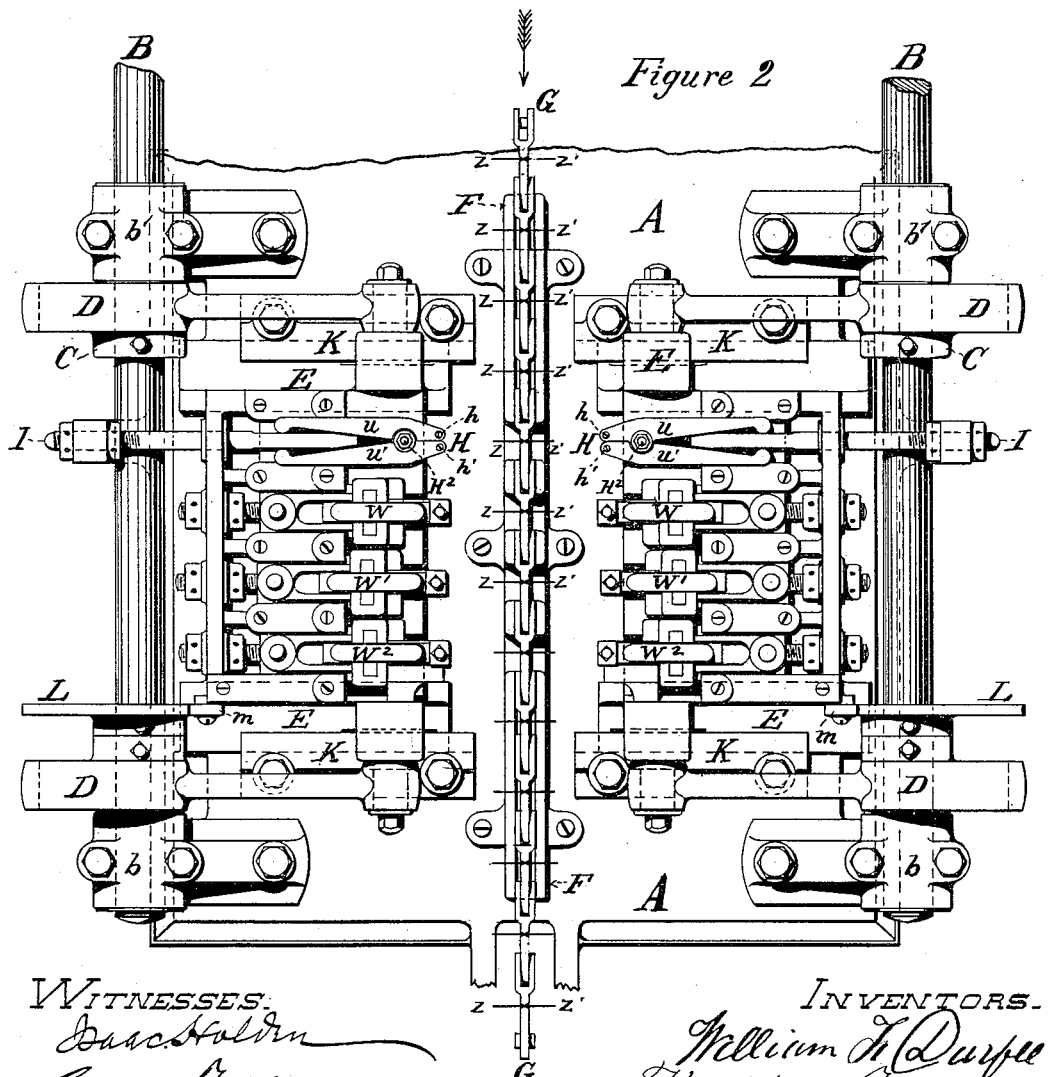
Figure 5:
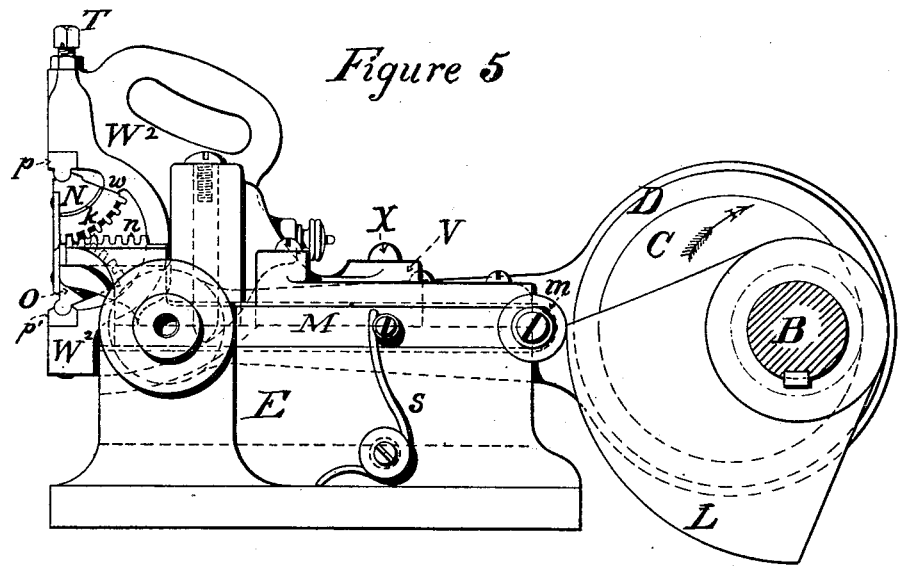
Figure 6:
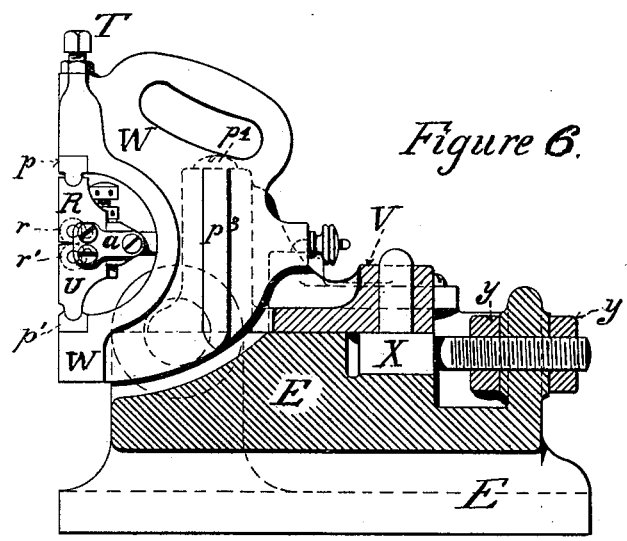
Figure 7:
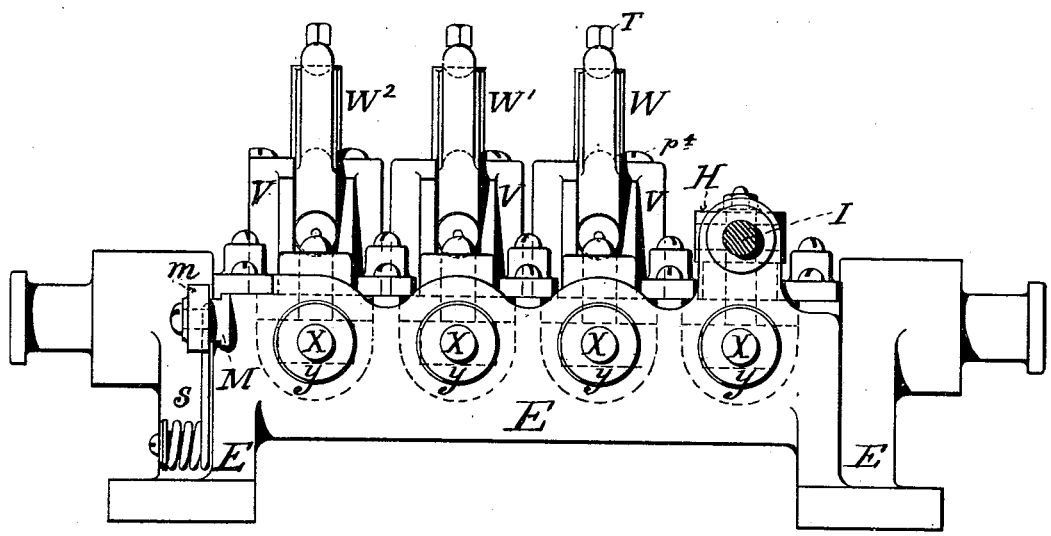
Figure 8:
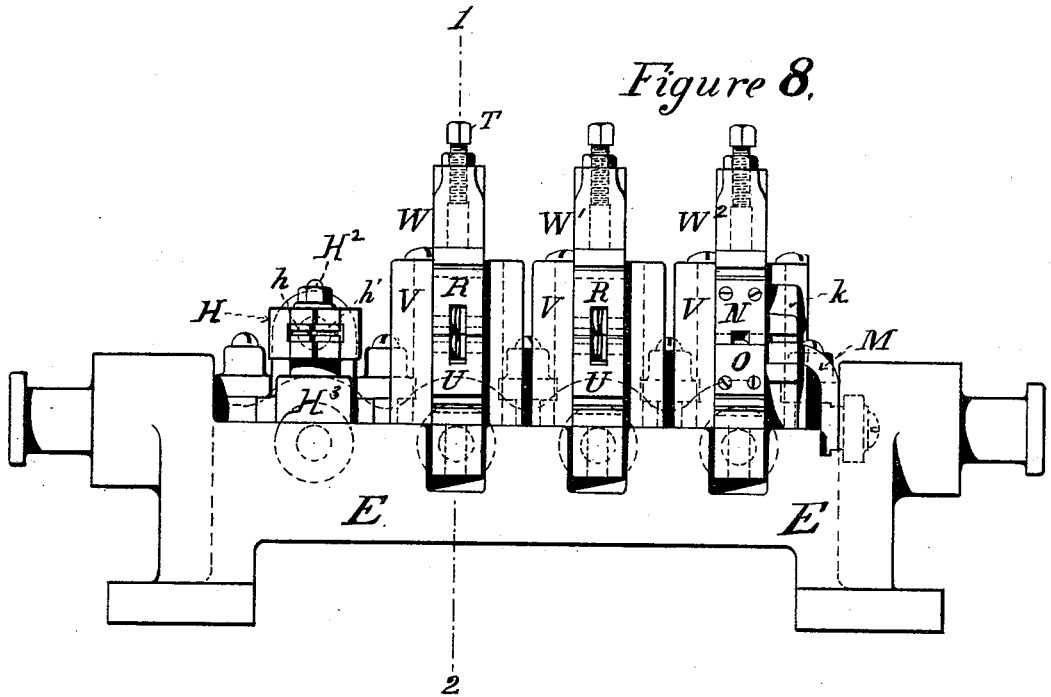
Figure 18:
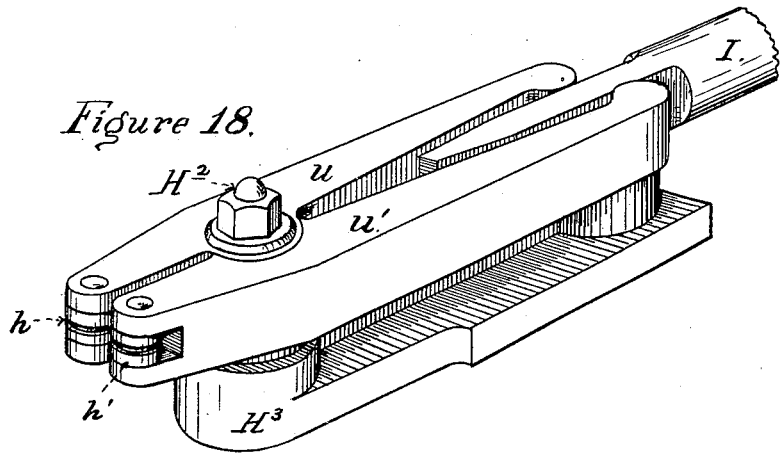
Figure 19:
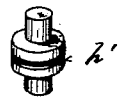
Figure 21:
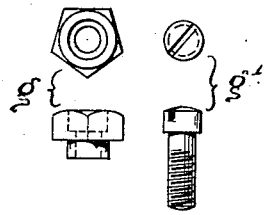
Figure 20:
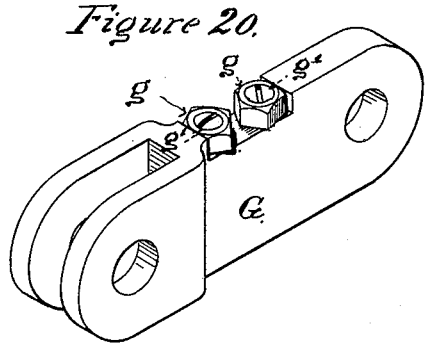

Referring to the drawings, Figure 1 shows an end elevation of the mechanism with one of the wheels supporting and operating the chain removed. Fig. 2 is a plan of that portion of the machine occupied by the tapering mechanism. Fig. 3 is a longitudinal section of Figs. 1 and 2, showing simply the manner of advancing the blank-conveying chain intermittently from the uniform rotations of the driving-shaft. Fig. 4 is a plan view of the mechanisms illustrated in the preceding figure, and shows, in addition thereto, the mode of imparting rotary motion to the side shafts of the machine. Fig. 5 is an enlarged elevation of the right-hand portion of Fig. 1, wherein the shaft-bearing *b* and base-plate A are removed. Fig. 6 is a sectional view of the same, taken on the line 1 2 of Fig. 8. Fig. 7 shows an elevation of Fig. 5 when said figure is viewed from the right-hand side, the shaft B and its attachments being removed. Fig. 8 is an elevation of Fig. 5 when viewed from the left-hand side. Figs. 9 and 10 represent respectively an enlarged front and side elevation of one of the reducing devices, W, with its attachments. Fig. 11 illustrates in section that portion of the mechanism of Fig. 10 which operates upon the metal blanks to be tapered, and Fig. 12 is a sectional plan view of the same. Figs. 13 and 14 represent a front and side elevation of the finishing mechanism forming part of the device $W^2$, Figs. 1, 2, and 8. Fig. 15 shows a plan and edge view of a metallic blank pending the action of the device $W^2$. Fig. 16 shows the same blank after having been acted upon by said device. Fig. 17 is a detached view of one of the grooved reducing-rollers carried in the adjacent ends of the toggles shown in Fig. 11. Fig. 18 is an enlarged perspective view of one of the devices, H, Fig. 2, used for tapering and rounding the edges of the blanks. Fig. 19 shows one of the grooved rollers carried at the short extremities of the device H shown in Fig. 18. Fig. 20 represents in perspective one link of the blank-carrying chain, drawn on an enlarged scale for the purpose of showing more clearly the details of construction; and Fig. 21 shows in detail the several removable parts which are combined to form the receiving-notches in the links of the blank-carrying chain.

Similar letters refer to similar parts throughout the several views, in which—

A is a base-plate for supporting the mechanisms.

G is an endless conveying-chain, composed of a series of links, each having in its upper surface a depression for the reception of the blanks on which the tapering mechanism is to operate, said chain being carried on and by the chain-wheels G' and $G^2$, (see Figs. 3 and 4,) and supported in the horizontal groove formed in the upper edge of the stationary bracket F, Figs. 1 and 2.

E and E represent two reciprocating carriages, which are guided by the gibs K, and moved simultaneously in opposite directions (through the medium of the connections D) by the eccentrics C C, attached to the rotating shafts B B, said shafts being supported by the brackets *b*, *b'*, and $b^2$, and rotated in unison by the mechanism shown in Figs. 3 and 4 or its equivalent. To each of the carriages E E aforesaid are attached the several reducing or tapering devices, H, W, W', and $W^2$.

The various operations are performed substantially as follows, to wit: The double-ended blanks Z to be operated upon are inserted either by hand or automatically into the receiving-notches formed in the upper edge of the links composing the endless chain G, which chain is caused to move intermittingly in the direction indicated by the arrow through the space of one link at each revolution of the driving-shaft B' by the intervention of the "star-wheel" and crank illustrated in Figs. 3 and 4. The notch in each link of the chain aforesaid is constructed substantially as shown in Figs. 20 and 21, wherein the sides of said notch are formed by the adjacent angles of the two pentagonal blocks of metal $g\ g$, said blocks being partly counterbored into the upper surface of the link, and secured in place therein by the two slotted-headed screws, $g'\ g'$, which pass through and have their heads counterbored into the pentagonal blocks aforesaid. By this construction it will be seen that in the event of the adjacent angles of the pentagonal blocks $g\ g$ becoming misshapen by use any other of the angles thereof may be substituted until all of the several angles are unfitted for further employment, when new blocks may be set in. After the blanks have been inserted in the several links of the chain, as aforesaid, they are carried along thereby intermittingly in the direction of the arrow (see Figs. 2, 3, and 4) until one of said blanks shall lie in such a position between the adjacent ends of the devices at H H, Fig. 2, that it may be operated upon thereby. These devices at H H (see Figs. 2, 7, 8, and 18) are composed of the two jaws or levers $u$ and $u'$, which are pivoted by the standing stud $H^2$ to the adjusting-block $H^3$ of the carriage E, and have the grooved rollers $h\ h'$ at their ends adjacent to the carrying-chain G, their opposite ends working against the sides of the stationary profile bars I I, which control the motion of said jaws relative to one another. When these devices are caused to move with the carriages toward the chain G by the rotation of the shafts B B and B' aforesaid the extremities of the blank hereinbefore mentioned will enter between the grooved rollers $h\ h'$, which operate on its edges for the purpose of tapering and rounding the same, the amount of taper being governed by the shape given to the end of the stationary profile bars I, and the cross-section of the rounded edges of the blank determined by the shape of the grooves in the rollers $h\ h'$ aforesaid. After this operation the carriages E E are caused to move away from the chain G, (by the further rotation of the shafts B B and B',) and the chain is advanced one link, which will bring the succeeding blank in position to be operated upon by the devices at H H, as described, while at the same time it carries the previously-rounded blank in position to be acted upon by the second tapering devices, W W, which are constructed and operated substantially as follows:

W (see Figs. 2, 6, 7, 8, 9, and 10) is the yoke or frame which carries the several parts of said device, and is, for convenience of adjustment and substitution, made removable from the holder V of the carriage E, into which it is held and adjusted by means of the projections $P^2$ and $P^3$ and the screw $P^4$, said holder V being adjusted in the carriage toward or from the chain G by means of the nuts $y\ y$, which operate it through the movable hook-bolt X.

R and U are toggle-levers, which are carried by the yoke W and operate radially from the horizontal bearings $p$ and $p'$, the upper one of which, $p$, is adjusted vertically by means of the set-screw T, provided for the purpose.

In order to keep the toggles R and U in proper relation to one another, and to insure their synchronous movement, we have arranged the two links $a\ a'$, the one end of which unites said toggles through the screws $c\ c'$, the other ends of said links being pivoted by the screws $f\ f'$ to the pressure-block $Y^2$, Figs. 11 and 12, said block being made to press against the two toggles simultaneously by means of the rod Y, (the extremity of which rests in a cavity in said block,) which is acted upon by the spring $y'$.

When it is desired to remove the toggles from the yoke W the pressure of said spring $y'$ against the block $Y^2$ is removed (by means of the nut $Z^2$) and the end of the rod Y withdrawn from the cavity in said block, thereby permitting the toggles R and U, with their appurtenances, to be removed sidewise from their cylindrical bearing-surfaces $p$ and $p'$. The toggles aforesaid are provided at their adjacent ends with the small grooved rollers $r\ r'$, Fig. 17, which are so adjusted relative to one another by means of the set-screw T that the space between the bottoms of their grooves is less than the thickness of the blank on which they are to operate. When the carriage E, which carries said device, is moved toward the chain G the end of the blank contained in said chain will press against the grooved rollers $r\ r'$ and cause the toggles R and U to swing out of their normal positions until the space between said rollers is sufficient to admit the blank, after which the aforesaid device is moved the desired distance toward the conveying-chain. This operation is taking place simultaneously on opposite sides of the chain upon each end of the blank. When the carriage aforesaid starts to move away from the chain the rollers $r\ r'$, in obedience to their natural tendency, aided by the pressure-spring $y'$, will embed themselves into the upper and under surfaces of the blank until the toggles have assumed their normal positions relative to the yoke W, (which positions are controlled and adjusted by the screws $R^2$ and T,) from which instant, by the continued movement of the carriage E, the rollers $r\ r'$ are drawn off from the blank, thus reducing its thickness the desired amount. After the carriage E leaves the nail-blank the conveying-chain G is again moved in the direction of the arrow until the blank already acted upon by the device W is brought into position to be operated upon by the device W', which is an exact counterpart of the device W, already described, and operates substantially the same; but it commences its reducing action upon the blank at a point farther removed from the center of the chain.

We do not confine ourselves to using any particular number of these reducing devices, as, by increasing the length of the carriages the necessary amount, any desired number may be made to operate upon the blanks. Fig. 15 illustrates the effect produced on a blank when several of these devices are employed, the first of which begins its reducing action at 1, the second at 2, the third at 3, and so on until the end of the blank is reached, thereby forming the several steps along its upper and under surfaces. For the purpose of removing these steps or ridges, and to secure a uniform taper throughout the length of the blank we have provided the device $W^2$, which consists of a yoke or frame similar to that described in connection with the device W; but in place of the toggles R and U and their attachments are inserted the toothed sectors N and O, (shown in Figs. 13 and 14,) which are provided with the removable dies $n^2$ and $n^3$, each having a groove in its outer curved surface, (whose bottom is eccentric with reference to the center about which the sectors respectively turn,) of a proper width to receive the nail-blank. The upper sector, N, has the projecting toothed segment $k$ on one side, which engages with the toothed rack $n$ of the sliding bar M, said bar being free to move horizontally in the carriage E at right angles to the chain G, and being provided at its outer extremity with a roller, $m$, which is made to press against the cam L by means of the spring $s$, attached to said carriage, which spring also holds the toothed sector N against its governing-stop $w$ on the yoke $W^2$. This last tapering device, $W^2$, operates upon the blanks substantially in the following manner, to wit: The carriage E, which carries said device, is moved toward the chain, and a blank, which has been reduced to the form substantially as shown in Fig. 15 by the previous operations, enters freely between the adjacent faces of the sectors N and O, after which the carriage continues its motion until it has reached its proximate position relative to the chain, at which time (by the rotating of the shaft B in the direction indicated by the arrow) the cam L comes in contact with the roller $m$ of the bar M, as shown in Fig. 5, and holds it stationary relative to the chain while the carriage is caused to recede from the chain in obedience to the rotation of the eccentrics C, the effect of which is to force the segment $k$ of the sector N to roll along the then stationary rack $n$, which motion will cause the two sectors N and O to roll along the blank which is between them, and thereby remove all inequalities and reduce it to the form substantially as shown in Fig. 16. As soon as the carriage has moved a sufficient distance away from the chain to have caused these devices to operate on the entire length of the blank, the cam L releases the bar M, and the spring $s$ operates thereon to force said bar toward the shaft B, and thereby bring the two sectors N and O to their normal positions, or that shown in Figs. 1, 5, and 13, when they are ready to operate on the succeeding blank.

The foregoing description, considered in connection with the illustrative drawings annexed, will show that the several operations described are performed by the various reducing devices named simultaneously on the opposite extremities of the several blanks held in the notches of the conveying-chain G, and that they succeed each other upon the opposite extremities of the same blank in accordance with the movement of the chain G and the carriage E, to which the reducing devices are severally attached, as hereinbefore described.

Having thus fully described the improvements, what we claim as new, and desire to secure by Letters Patent, is—

1. The combination of the base-plate A, grooved bracket F, conveying-chain G, gibs K K, carriages E E, adapted to move thereon in opposite directions, shafts B B, eccentrics C C, connections D D, reducing and tapering devices mounted on said carriages, and suitable operating mechanism, substantially as shown and described.

2. The combination, with the notched conveying-chain G and carriages E E, of the adjusting-blocks $H^3$, jaws or levers $u$ $u'$, pivoted by means of a stud, $H^2$, and carrying rollers $h$ $h'$, the profile bars I I, and means for operating said carriages and chain, substantially as shown and described.

3. The vertical toggle-jointed reducing device shown in Fig. 10, provided with rollers in the adjacent ends of the joints, forming the toggles aforesaid, in combination with a pressure-pin (acted upon by means of a spiral spring) pressing against the rear of said toggles through the medium of a pressure-block, to the sides of which block are attached one end of a pair of links, the other extremities of which are provided with jaws which engage with pins in the sides of the adjacent ends of said toggles, thus insuring their simultaneous action, all inclosed and held by means of a frame in which their several functions are performed, arranged and operating in the manner and for the purpose substantially as described.

4. In a notched chain for carrying metallic blanks, the adjustable pentagonal blocks $g$ $g$, secured to the chain-links, substantially as and for the purpose set forth.

5. The combination, with the conveying-chain G and reciprocating carriage E, having holder V, of the yoke W, having bearings $p$ $p'$, projections $p^2$ $p^3$, screws $p^4$, T, and $R^2$, hook-bolt X, having nuts $y$ $y$, toggle-levers R U, supported by the yoke W, and provided with adjustable grooved rollers $r\ r'$, the links $a\ a'$, screws $c\ c'\ f\ f'$, pressure-block $Y^2$, rod $Y$, spring $y'$, and nut $Z^2$, substantially as and for the purposes described.

6. The combination, with the conveying-chain $G$ and carriage $E$, of a smoothing mechanism consisting of the yoke $W^2$, provided with stop $w$, toothed sectors $N\ O$, supported in said yoke and having removable grooved dies $n^2\ n^3$, sliding bar $M$, carrying rack $n$, and roller $m$, the cam $L$, spring $s$, and suitable actuating mechanism, substantially as shown and described.

7. The combination, with the notched chain $G$ and means for imparting an intermittent motion thereto, of the carriages $E\ E$, tapering mechanism $H$, composed of jaws $u\ u'$, having grooved rollers $h\ h'$, the reducing devices $W\ W'$, having spring-actuated toggle-levers provided with grooved rollers $r\ r'$, smoothing devices $W^2$, composed of a yoke or frame supporting the toothed sectors $N\ O$, and suitable operating mechanism, all substantially as shown and described.

In testimony whereof we affix our signatures in presence of two witnesses.

WILLIAM F. DURFEE.
THADDEUS FOWLER,
*Administrator.*

Witnesses:
ISAAC HOLDEN,
GEORGE TERRY.